US011455423B2

(12) United States Patent
Kochura et al.

(10) Patent No.: US 11,455,423 B2
(45) Date of Patent: *Sep. 27, 2022

(54) SAFEGUARDING CONFIDENTIAL INFORMATION DURING A SCREEN SHARE SESSION

(71) Applicant: INTERNATIONAL BUSINESS MACHINES CORPORATION, Armonk, NY (US)

(72) Inventors: Nadiya Kochura, Bolton, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 122 days.

This patent is subject to a terminal disclaimer.

(21) Appl. No.: 17/154,305

(22) Filed: Jan. 21, 2021

(65) Prior Publication Data
US 2021/0141933 A1 May 13, 2021

Related U.S. Application Data

(63) Continuation of application No. 16/752,004, filed on Jan. 24, 2020, now Pat. No. 10,956,609, which is a (Continued)

(51) Int. Cl.
*G06F 21/62* (2013.01)
*G06F 40/30* (2020.01)
(Continued)

(52) U.S. Cl.
CPC ...... *G06F 21/6245* (2013.01); *G06F 21/6254* (2013.01); *G06F 40/151* (2020.01); (Continued)

(58) Field of Classification Search
CPC ............. G06F 21/6245; G06F 21/6254; G06F 40/151; G06F 40/30; G06F 3/0482; G06F 40/40
See application file for complete search history.

(56) References Cited

U.S. PATENT DOCUMENTS 5,583,993 A 12/1996 Foster
5,778,398 A 7/1998 Nagashima
(Continued)

FOREIGN PATENT DOCUMENTS

CN 106599041 A 4/2017
WO WO-2014014215 A1 * 1/2014 ............... G09B 5/00

OTHER PUBLICATIONS

IBM: List of IBM Patents or Patent Applications Treated as Related (Appendix P), Jan. 27, 2021, pp. 1-2.
(Continued)

*Primary Examiner* — Shahriar Zarrineh
(74) *Attorney, Agent, or Firm* — Michael O'Keefe

(57) ABSTRACT

A method for safeguarding confidential information during a screen share between two computing devices each having a screen. The method includes receiving, from a first computer, a request to share content of one or more applications displayable on a screen of a second computer. The method further includes summarizing the content to be displayed by the one or more applications, and transmitting, by the first computer, the summarized content to be shared by the one or more applications with the second computer. In exemplary embodiments, the summarized content may be password protected. The method may further include prompting, by the second computer, a password entry and displaying, by the second computer, the summarized content based on a password match.

17 Claims, 7 Drawing Sheets

Related U.S. Application Data continuation of application No. 15/821,869, filed on Nov. 24, 2017, now Pat. No. 10,586,071.

(51) Int. Cl.
  *G06F 40/151* (2020.01)
  *G06F 3/0482* (2013.01)
  *G06F 40/40* (2020.01)

(52) U.S. Cl.
  CPC ............ *G06F 40/30* (2020.01); *G06F 3/0482* (2013.01); *G06F 40/40* (2020.01)

(56) References Cited

U.S. PATENT DOCUMENTS

| | | | |
|---|---|---|---|
| 6,418,421 B1 | 7/2002 | Hurtado | |
| 6,804,778 B1 | 10/2004 | Levi | |
| 7,284,203 B1 | 10/2007 | Meeks | |
| 7,383,347 B2 | 6/2008 | Ebling | |
| 7,441,000 B2* | 10/2008 | Boehringer | G06Q 10/10 709/224 |
| 7,653,192 B1* | 1/2010 | Sylvain | H04M 3/567 379/202.01 |
| 7,747,685 B2 | 6/2010 | Chen | |
| 8,117,461 B2 | 2/2012 | Bigelow, Jr. | |
| 8,135,699 B2* | 3/2012 | Gupta | G06F 16/345 704/240 |
| 8,245,135 B2 | 8/2012 | Cai | |
| 8,312,081 B2* | 11/2012 | Yuan | H04L 67/148 709/204 |
| 8,355,949 B1 | 1/2013 | Agostino | |
| 8,687,941 B2 | 4/2014 | Dirik | |
| 8,782,559 B2 | 7/2014 | Ikeda | |
| 8,914,452 B2 | 12/2014 | Boston | |
| 8,984,405 B1 | 3/2015 | Geller | |
| 9,058,490 B1 | 6/2015 | Barker | |
| 9,141,332 B2 | 9/2015 | Coleman | |
| 9,354,928 B1 | 5/2016 | Buchheit | |
| 9,361,469 B2 | 6/2016 | Thiyagarajan | |
| 9,557,878 B2 | 1/2017 | Chen | |
| 9,582,574 B2 | 2/2017 | Cardonha | |
| 9,699,271 B2* | 7/2017 | Brander | G06F 21/6245 |
| 9,842,341 B2 | 12/2017 | Koch | |
| 9,940,007 B2 | 4/2018 | Lei | |
| 9,990,114 B1 | 6/2018 | Horton | |
| 10,061,761 B2 | 8/2018 | Fan | |
| 10,178,350 B2* | 1/2019 | Mueller | H04L 12/1831 |
| 10,262,327 B1 | 4/2019 | Hardebeck | |
| 10,586,071 B2 | 3/2020 | Kochura | |
| 10,684,738 B1 | 6/2020 | Sicora | |
| 11,277,227 B2* | 3/2022 | Wu | H04L 1/0009 |
| 2002/0038346 A1 | 3/2002 | Morrison | |
| 2003/0189601 A1 | 10/2003 | Ben-Shachar | |
| 2004/0119740 A1 | 6/2004 | Chang | |
| 2004/0252185 A1 | 12/2004 | Vernon | |
| 2005/0050044 A1 | 3/2005 | Takagi | |
| 2006/0008788 A1 | 1/2006 | Dorsett | |
| 2006/0010217 A1* | 1/2006 | Sood | H04L 51/212 709/206 |
| 2006/0010392 A1 | 1/2006 | Noel | |
| 2006/0031779 A1 | 2/2006 | Theurer | |
| 2006/0208871 A1* | 9/2006 | Hansen | G06F 3/1454 709/219 |
| 2006/0271877 A1 | 11/2006 | Theurer | |
| 2007/0011258 A1 | 1/2007 | Khoo | |
| 2007/0097150 A1 | 5/2007 | Ivashin | |
| 2007/0130257 A1 | 6/2007 | Bedi | |
| 2007/0299859 A1 | 12/2007 | Gupta | |
| 2008/0046218 A1 | 2/2008 | Dontcheva | |
| 2008/0109679 A1 | 5/2008 | Wright | |
| 2008/0262910 A1* | 10/2008 | Altberg | G06Q 30/0273 705/14.69 |
| 2008/0263446 A1 | 10/2008 | Altberg | |
| 2009/0096810 A1 | 4/2009 | Green | |
| 2009/0100462 A1 | 4/2009 | Park | |
| 2009/0217177 A1 | 8/2009 | Degrazia | |
| 2010/0257450 A1 | 10/2010 | Go | |
| 2011/0004888 A1 | 1/2011 | Srinivasan | |
| 2011/0010629 A1 | 1/2011 | Castro | |
| 2011/0035685 A1 | 2/2011 | Johanson | |
| 2011/0134120 A1 | 6/2011 | Antonyuk | |
| 2011/0202854 A1* | 8/2011 | Chan | G06F 3/1454 715/762 |
| 2011/0252366 A1 | 10/2011 | Balasubramanian | |
| 2011/0283203 A1* | 11/2011 | Periyannan | H04N 5/265 715/753 |
| 2012/0054275 A1 | 3/2012 | Channell | |
| 2012/0166921 A1 | 6/2012 | Alexandrov | |
| 2012/0173318 A1 | 7/2012 | Lee | |
| 2012/0324006 A1 | 12/2012 | Garofalo | |
| 2013/0007895 A1 | 1/2013 | Brolley | |
| 2013/0019186 A1 | 1/2013 | Lance | |
| 2013/0055113 A1 | 2/2013 | Chazin | |
| 2013/0055143 A1* | 2/2013 | Martin | G06F 3/0425 345/157 |
| 2013/0125009 A1 | 5/2013 | Deluca | |
| 2013/0144964 A1 | 6/2013 | Odell | |
| 2013/0152138 A1 | 6/2013 | Jeong | |
| 2013/0238684 A1 | 9/2013 | Patil | |
| 2013/0239014 A1 | 9/2013 | Patil | |
| 2013/0290861 A1* | 10/2013 | Chen | G06F 9/445 715/744 |
| 2013/0332412 A1 | 12/2013 | Amarendran | |
| 2014/0019884 A1 | 1/2014 | Dinan | |
| 2014/0059237 A1 | 2/2014 | Pittman | |
| 2014/0096033 A1* | 4/2014 | Blair | H04L 51/56 715/752 |
| 2014/0108544 A1 | 4/2014 | Lewis | |
| 2014/0136990 A1 | 5/2014 | Gonnen | |
| 2014/0165164 A1 | 6/2014 | Pizurica | |
| 2014/0259158 A1 | 9/2014 | Brown | |
| 2014/0283145 A1 | 9/2014 | Chebiyyam | |
| 2014/0304216 A1 | 10/2014 | Rohra | |
| 2014/0340407 A1 | 11/2014 | Perez | |
| 2015/0007070 A1 | 1/2015 | Saaroni | |
| 2015/0032686 A1 | 1/2015 | Kuchoor | |
| 2015/0039982 A1 | 2/2015 | Bastide | |
| 2015/0058415 A1* | 2/2015 | Toebes | H04L 65/403 709/204 |
| 2015/0065104 A1* | 3/2015 | White | H04M 3/565 455/416 |
| 2015/0106730 A1 | 4/2015 | Wang | |
| 2015/0120671 A1 | 4/2015 | Kao | |
| 2015/0149916 A1 | 5/2015 | Mendez | |
| 2015/0278534 A1* | 10/2015 | Thiyagarajan | G06F 21/84 726/28 |
| 2015/0286391 A1* | 10/2015 | Jacobs | G06F 3/04847 715/771 |
| 2015/0296176 A1 | 10/2015 | Kato | |
| 2016/0127432 A1 | 5/2016 | Privat | |
| 2016/0147387 A1 | 5/2016 | Rahman | |
| 2016/0179295 A1 | 6/2016 | Liang | |
| 2016/0234265 A1 | 8/2016 | Lohe | |
| 2016/0253308 A1 | 9/2016 | Olinger | |
| 2016/0259434 A1 | 9/2016 | Kato | |
| 2016/0300373 A1 | 10/2016 | Vanblon | |
| 2016/0307002 A1 | 10/2016 | Zha | |
| 2017/0006137 A1 | 1/2017 | Khan | |
| 2017/0024100 A1 | 1/2017 | Pieper | |
| 2017/0052755 A1* | 2/2017 | Miki | H04L 65/403 |
| 2017/0085854 A1 | 3/2017 | Furesjö | |
| 2017/0093943 A1 | 3/2017 | Alsina | |
| 2017/0126689 A1 | 5/2017 | Lloyd | |
| 2017/0147829 A1 | 5/2017 | Cismas | |
| 2017/0223069 A1 | 8/2017 | Arora | |
| 2017/0289070 A1 | 10/2017 | Plumb | |
| 2017/0300286 A1 | 10/2017 | Lieb | |
| 2017/0344895 A1* | 11/2017 | Roy | G06N 20/00 |
| 2018/0075658 A1 | 3/2018 | Lanier | |
| 2018/0203601 A1 | 7/2018 | Birchfield | |
| 2018/0205797 A1 | 7/2018 | Faulkner | |
| 2018/0253717 A1 | 9/2018 | Kim | |
| 2019/0012059 A1 | 1/2019 | Kwon | |

(56) References Cited

U.S. PATENT DOCUMENTS

| | | |
|---|---|---|
| 2019/0158492 A1 | 5/2019 | Zavesky |
| 2019/0163927 A1 | 5/2019 | Kochura |
| 2019/0166330 A1 | 5/2019 | Ma |
| 2020/0159958 A1 | 5/2020 | Kochura |
| 2022/0116441 A1* | 4/2022 | Liu .................. H04L 65/75 |

OTHER PUBLICATIONS

Bomgar, "Screen Share with the Remote Customer for View and Control," Control the Remote System with Screen Sharing, https://www.bomgar.com/docs/remote-support/getting-started/rep-console/screen-sharing.htm, Printed on Sep. 24, 2017, pp. 1-5.

Mell et al., "The NIST Definition of Cloud Computing," National Institute of Standards and Technology, U.S. Department of Commerce, Special Publication 800-145, Sep. 2011, pp. 1-7.

* cited by examiner

SAFEGUARDING CONFIDENTIAL INFORMATION DURING A SCREEN SHARE SESSION

BACKGROUND

Embodiments of the present invention relate generally to the field of computing and more particularly to data processing and protecting confidential information during a screen sharing session between multiple users.

Screen sharing is a common way for two or more users to work collaboratively with each other or to communicate interactively. The availability of instant messenger chat programs and web-conferencing, together with document sharing, has led to closer working relationships between employees, even if those employees may be sitting in offices on opposite ends of the world. In many work environments, two or more employees currently have the option to share a computer screen with another member of their team, thereby fostering a closer working relationship as well as increasing the chances of revealing confidential documents, emails, or other private information that may be open during a screen sharing session.

Oftentimes, a user may not pay close attention to content they are sharing, or perhaps not even realize that confidential information is contained within the content they are sharing. This may be due to a user being in a rush, or simply being careless.

Currently, there is no mechanism to automatically hide confidential or private information that a user is sharing during a screen sharing session.

SUMMARY

Embodiments of the invention include a method, computer program product, and system, for safeguarding confidential information during a screen share session between two computing devices each having a screen.

A method, according to an embodiment, for safeguarding confidential information during a screen share session between two computing devices each having a screen, includes receiving, from a first computer, a request to share content of one or more applications displayable on a screen of a second computer. The method further includes summarizing the content to be displayed by the one or more applications, and transmitting, by the first computer, the summarized content to be shared by the one or more applications with the second computer.

A computer program product, according to an embodiment of the invention, includes a non-transitory tangible storage device having program code embodied therewith. The program code is executable by a processor of a computer to perform a method. The method includes receiving, from a first computer, a request to share content of one or more applications displayable on a screen of a second computer. The method further includes summarizing the content to be displayed by the one or more applications, and transmitting, by the first computer, the summarized content to be shared by the one or more applications with the second computer.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method includes receiving, from a first computer, a request to share content of one or more applications displayable on a screen of a second computer. The method further includes summarizing the content to be displayed by the one or more applications, and transmitting, by the first computer, the summarized content to be shared by the one or more applications with the second computer.

DETAILED DESCRIPTION

Currently, there is existing software such as IBM Same-Time® (SameTime is a registered trademark of IBM Corporation) meeting room that allows the user to share either their whole screen or just a file. Furthermore, there are additional precautions that must be considered when a user shares either their screen or a file.

The present invention can intelligently share a user screen, or file, with message composition styles to prevent the user from sharing private or confidential information by accident. For example, sometimes a user may not intend to have certain private applications open on their desktop during a screen share, or send a particular file to a recipient. Other times, a recipient may have other people in the room who are not intended recipients of the shared information.

Some of the message composition style techniques disclosed by the present invention may include only sharing a few keywords in the screen share session, rather than a full message. In this instance, a sender can choose to expand the full message through additional menu selections or a mouse click. This safety measure provides a second look for the sender in order to ensure that the sent message, or file, is the correct message or file for the intended recipient.

Another message composition style technique disclosed by the present invention may include only displaying a code name that can be understood between the sender and the receiver, or popping up a small avatar to ask the receiver whether it is OK to currently share the screen.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Figure 1:
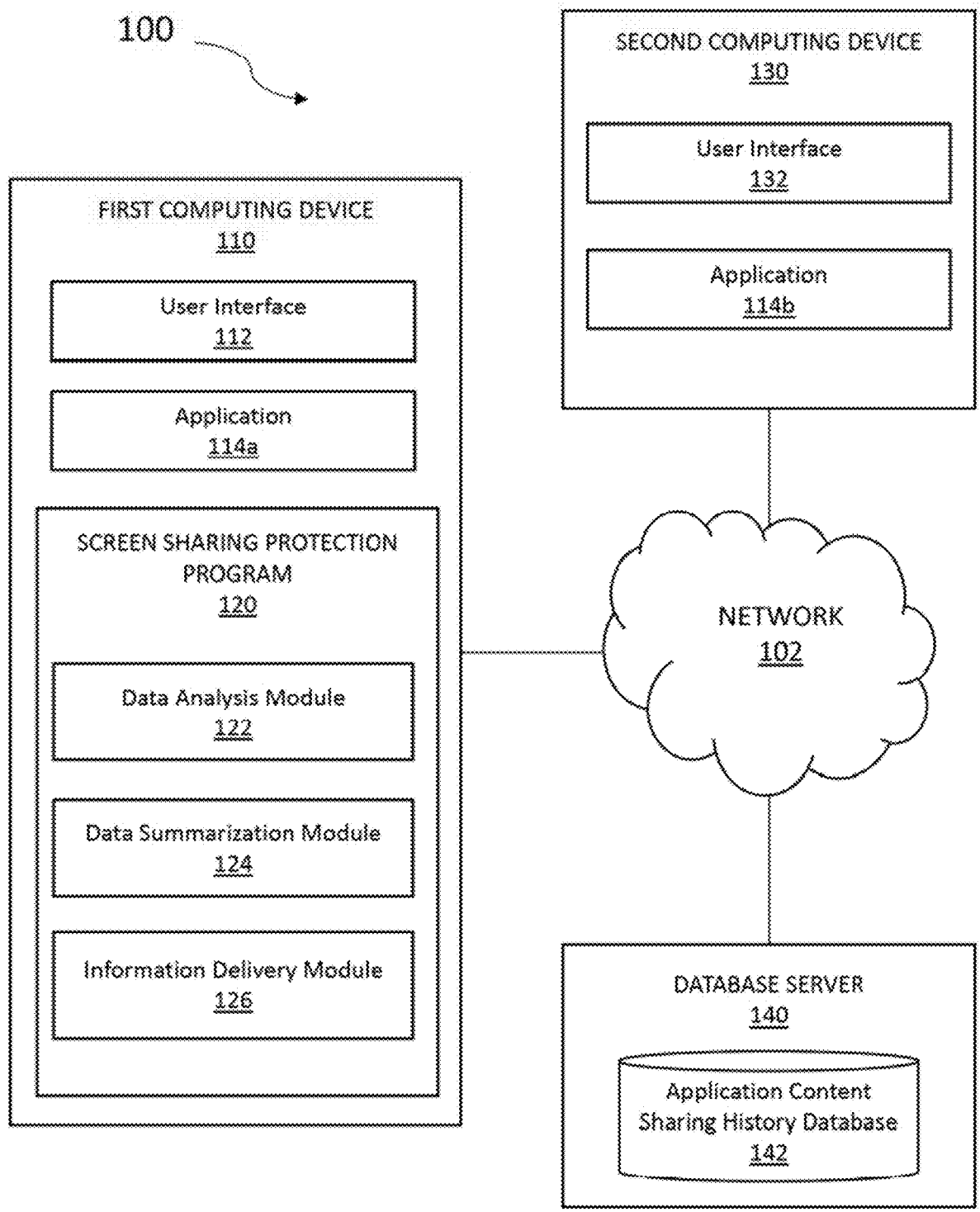
FIG. 1 illustrates screen sharing computing environment 100, in accordance with an embodiment of the present invention.

FIG. 1 illustrates a screen sharing computing environment 100, in accordance with an embodiment of the present invention. Computing environment 100 includes first computing device 110, second computing device 130, and database server 140 all connected via network 102. The setup in FIG. 1 represents an example embodiment configuration for the present invention, and is not limited to the depicted setup in order to derive benefit from the present invention.

In the example embodiment, first computing device 110 contains user interface 112, application 114a, and screen sharing protection program 120. In various embodiments, first computing device 110 may be a laptop computer, tablet computer, netbook computer, personal computer (PC), a desktop computer, a personal digital assistant (PDA), a smart phone, or any programmable electronic device capable of communicating with second computing device 130 and database server 140 via network 102. First computing device 110 may include internal and external hardware components, as depicted and described in further detail below with reference to FIG. 5. In other embodiments, first computing device 110 may be implemented in a cloud computing environment, as described in relation to FIGS. 6 and 7, herein. First computing device 110 may also have wireless connectivity capabilities allowing it to communicate with second computing device 130 and database server 140, as well as other computers or servers over network 102.

In an exemplary embodiment, user interface 112 may be a computer program that allows a user to interact with first computing device 110 and other connected devices via network 102. For example, user interface 112 may be a graphical user interface (GUI). In addition to comprising a computer program, user interface 112 may be connectively coupled to hardware components, such as those depicted in FIG. 5, for receiving user input. In an example embodiment, user interface 112 is a web browser, however in other embodiments user interface 112 may be a different program capable of receiving user interaction and communicating with other devices.

In an exemplary embodiment, application 114a may be a computer program, on first computing device 110, that is capable of communicating with another computer, such as second computing device 130. In an exemplary embodiment, application 114 may be an instant messenger service on first computing device 110 that is capable of sharing a computer screen with other users, receiving and/or sending data files, instant messaging, web-conferencing with a group of one or more users, or sharing information on first computing device 110 with second computing device 130 via any other known method to one of ordinary skill in the art. In exemplary embodiments, data files may include, but are not limited to, word processing files, video files, audio files, graphics files, and so forth.

In an exemplary embodiment, application 114 is depicted in FIG. 1 as application 114a on first computing device 110, and as application 114b on second computing device 130 thereby illustrating that application 114 is the same on both first computing device 110 and computing device 130. For example, a first user, on a first computing device 110, may utilize the functionality (e.g. screen share, file transfer) of an instant messaging application only if a second user, on a second computing device 130 also has the same instant messaging application.

In an exemplary embodiment, screen sharing protection program 120 contains instruction sets, executable by a processor, which may be described using a set of functional modules. The functional modules of screen sharing protection program 120 include data analysis module 122, data summarization module 124, and information delivery module 126.

With continued reference to FIG. 1, second computing device 130 contains user interface 132 and application 114b may be a laptop computer, tablet computer, netbook computer, personal computer (PC), a desktop computer, a personal digital assistant (PDA), a smart phone, or any programmable electronic device capable of communicating with first computing device 110 and database server 140 via network 102. While second computing device 130 is shown as a single device, in other embodiments, second computing device 130 may be comprised of a cluster or plurality of computing devices, working together or working separately. Second computing device 130 may be implemented in a cloud computing environment, as described in relation to FIGS. 6 and 7, herein. Second computing device 130 may also have wireless connectivity capabilities allowing it to communicate with first computing device 110 and database server 140, as well as other computers or servers over network 102.

In an exemplary embodiment, user interface 132 may be a computer program that allows a user to interact with second computing device 130 and other connected devices via network 102. For example, user interface 132 may be a graphical user interface (GUI). In addition to comprising a computer program, user interface 132 may be connectively coupled to hardware components, such as those depicted in FIG. 5, for receiving user input. In an example embodiment, user interface 132 is a web browser, however in other embodiments user interface 132 may be a different program capable of receiving user interaction and communicating with other devices.

With continued reference to FIG. 1, database server 140 includes application content sharing history database 142 and may be a laptop computer, tablet computer, netbook computer, personal computer (PC), a desktop computer, a personal digital assistant (PDA), a smart phone, a server, or any programmable electronic device capable of communicating with first computing device 110 and second computing device 130 via network 102. While database server 140 is shown as a single device, in other embodiments, database server 140 may be comprised of a cluster or plurality of computing devices, working together or working separately.

In an exemplary embodiment, application content sharing history database 142 may store an application type, a shared data file type, sharing frequency, communication history, and so forth which may be depicted as a data model. For example, the data model may identify the content of the shared data file (e.g. whether the application content is text, graphics, images, or video), whether it is possible to have a summarized or shortened message (e.g. 1 for "yes", 0 for "no"), recipient, and frequency. As such, a data model stored in application content sharing history database 142 may appear as <JPEG, 1, user3, 5>.

In further embodiments, application content sharing history database 142 may store an application sharing history organized by recipient, type of file, and screen sharing protection in place to protect private or confidential information for a particular file or application. In alternative embodiments, application content sharing history database 142 may be organized in any fashion deemed most useful for the invention to be utilized.

In various embodiments, application content sharing history database 142 may be stored on first computing device 110 as a separate database.

Figure 2:
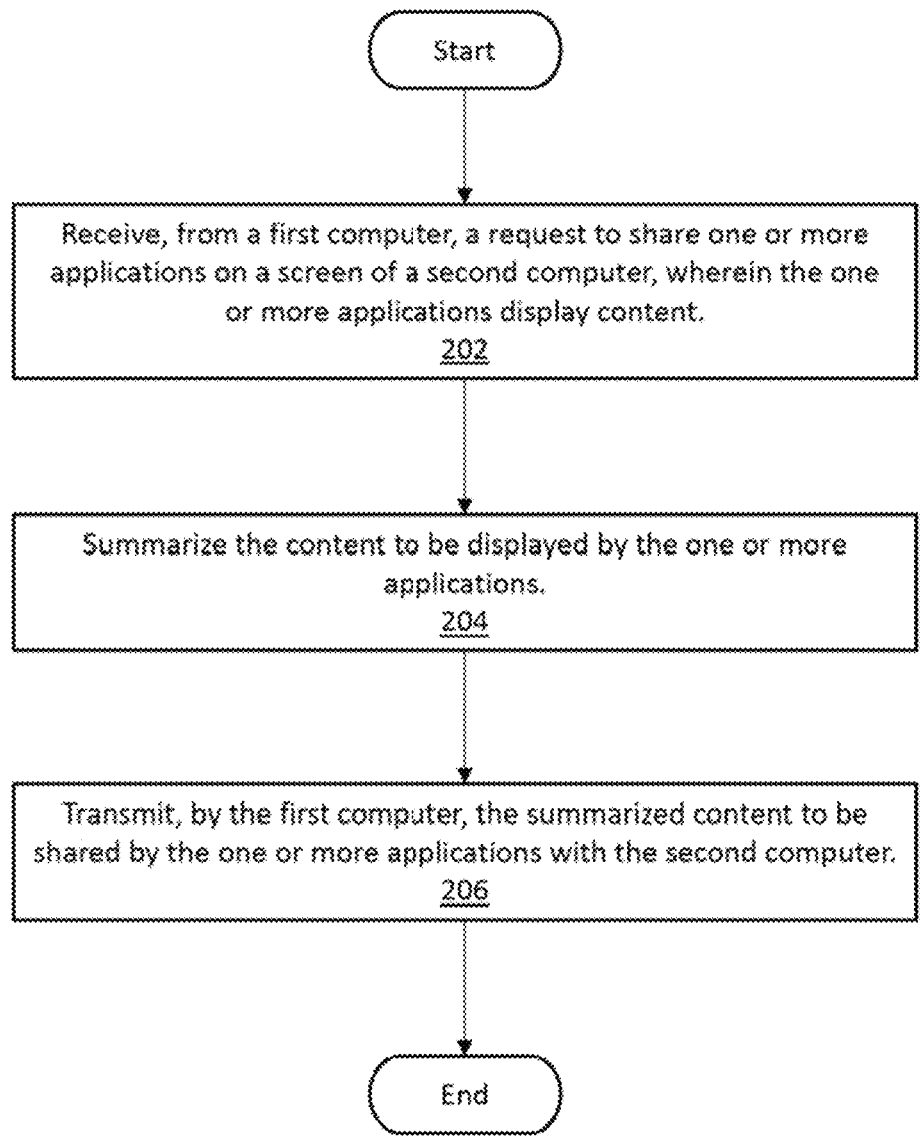
FIG. 2 is a flowchart illustrating the operation of screen sharing protection program 120, in accordance with an embodiment of the present invention.

FIG. 2 is a flowchart illustrating the operation of screen sharing protection program 120, in accordance with an embodiment of the present invention.

Referring now to FIGS. 1 and 2, screen sharing protection program 120 may detect a screen share of one or more applications having content and safeguard confidential information from being inadvertently revealed during a screen share.

With continued reference to FIGS. 1 and 2, data analysis module 122 includes a set of programming instructions in screen sharing protection program 120. The set of programming instructions is executable by a processor. Data analysis module 122 receives, from a first computing device 110, a request to share content of one or more applications displayable on a screen of a second computing device 130 (step 202). For example, one or more applications may be a text document, a power-point presentation, a spreadsheet, an image, or any other type of software medium that may be shared, and displayed, electronically with another computing device.

In an exemplary embodiment, data analysis module 122 analyzes which applications, or which portion of the computer screen of first computing device 110, tend to be shared the most during a screen sharing session with second computing device 130. Data analysis module 122 may detect the nature of the one or more applications to be shared during a screen sharing session with second computing device 130, for example the application may be an e-mail client, an instant messaging client, a word processing client, or a software development integrated development environment (IDE) client.

In exemplary embodiments, data analysis module 122 determines which of the one or more applications contain either a lot of text or graphics, or essentially a lot of content. A lot of content within an application may increase the chance of a user sharing information that is confidential. In exemplary embodiments, data analysis module 122 may determine a lot of content within an application by detecting a word count, a file size, and/or analyzing metadata of an application.

Data analysis module 122, in exemplary embodiments, may determine which application is suitable for shortening (i.e. summarizing) text content or graphical content in an application. For example, an e-mail client's text may be shortened through enabling technology, while source code in an IDE may be more difficult to be summarized.

With continued reference to FIGS. 1 and 2, data summarization module 124 includes a set of programming instructions in screen sharing protection program 120. The set of programming instructions is executable by a processor. Data summarization module 124 summarizes the content to be displayed by the one or more applications (step 204). Summarization of content within an application may simply be taking the subject line of an e-mail, for example, and displaying only that portion of the e-mail. In other embodiments, summarization may include performing a natural language text analysis of a text document and displaying a span of the text that includes a general concept, or idea, without including any sensitive or confidential information (e.g. names, numbers, locations), such as specific information about the general concept. In yet other embodiments, summarization of an image or video may include performing image analysis techniques to display only a generic thumbnail of a portion of the image, or video.

In exemplary embodiments, data summarization module 124 may determine that the received content contained within one or more applications may contain confidential content. As such, data summarization module 124 may be capable of summarizing the content of the one or more applications containing confidential content. Applications that may contain confidential content may include a web browser, an instant messaging application, a work/private e-mail account, just to name a few. These applications contain potentially confidential content, since, if left open a user's desktop, may disclose confidential information on a screen share with a second computing device 130. Examples of confidential content within these applications may include a business spreadsheet, a private website, an e-mail discussing confidential work-related matters, a private instant message chat discussing a confidential project, tax information, medical information, and so forth.

In another exemplary embodiment, data summarization module 124 may be capable of allowing the user who shares the content of one or more applications displayed on their computer screen (i.e. of first computing device 110) to further highlight the currently summarized content (e.g. text, graphics, video), with recipients of the content of the one or more applications displayed on the screen of second computing device 130, by selecting a context menu to expand the summarized content to full content as needed, on the fly.

Figure 3:
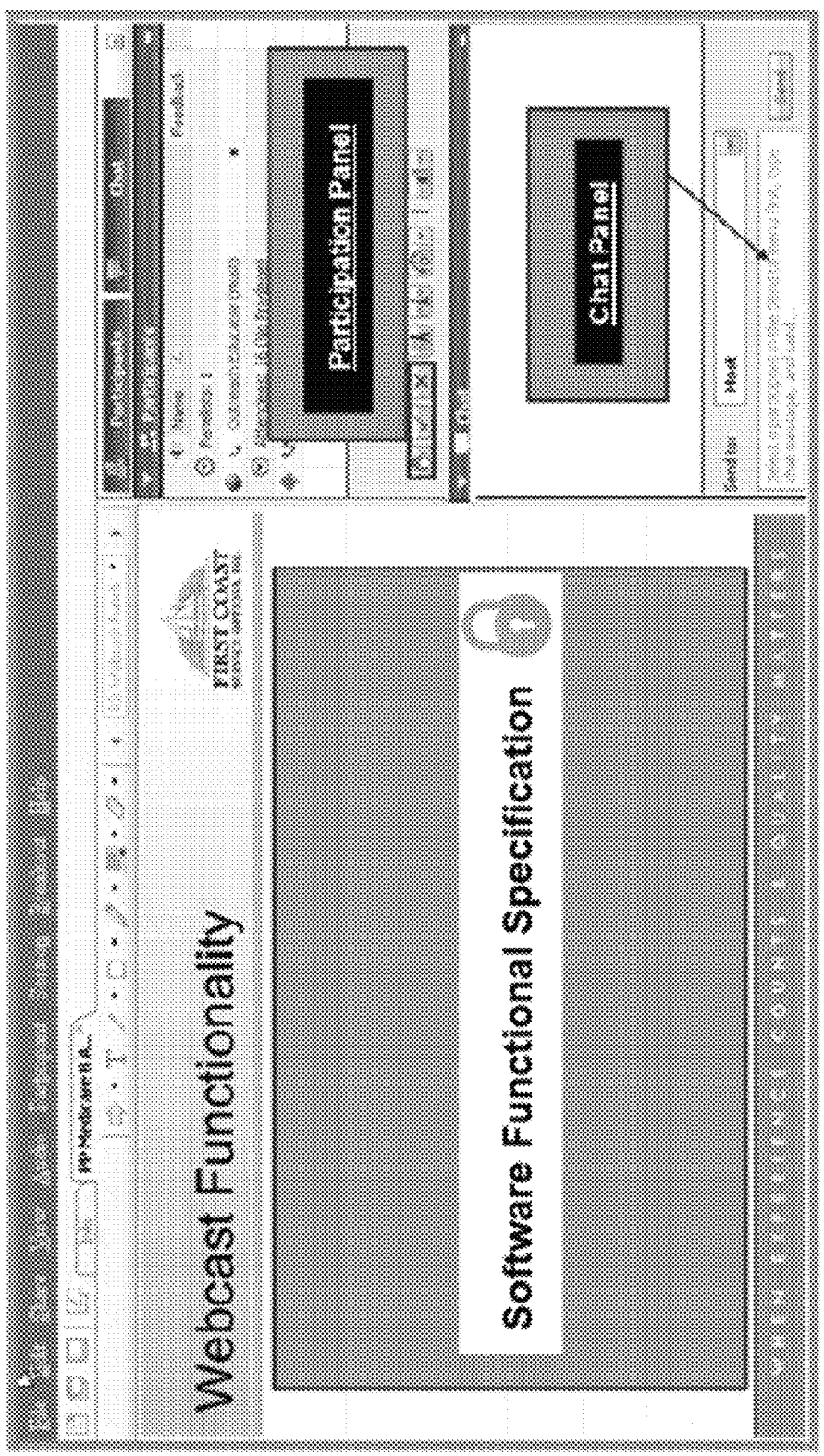
FIG. 3 depicts a shared computer screen containing summarized content of a slide in a power-point presentation, in accordance with an embodiment of the present invention.

FIG. 3 depicts a shared computer screen containing summarized content of a slide in a power-point presentation, in accordance with an embodiment of the present invention.

With reference to FIGS. 1-3, second computing device 130 may receive the summarized content shared by the one or more applications and display the summarized content on the computer screen of second computing device 130.

In alternative embodiments, and with continued reference to FIGS. 1-3, a user on computing device 110 may be sharing the content of one or more applications displayed on her computer screen, for example a power-point presentation, in a web conference with multiple users using multiple computing devices, including second computing device 130, at once. Some of the users may not be privy to viewing some of the information presented. In this scenario, data summarization module 124 may only display a summarized content of the slide, for example "Software Functional Specification", rather than the entire power-point slide. In this scenario, the users with clearance to view the full slide may need to input a password to unlock the slide contents. Alternatively, the user sharing the screen may have the option to lock/unlock the summarized content for a pre-configured list of recipients of the screen share.

With continued reference to FIGS. 1-3, in exemplary embodiments, the summarized content of an application may be password protected, wherein data summarization module 124 prompts a request to view the summarized content shared by the one or more applications. Second computing device 130 may display the summarized content based on a password match entered by a user of second computing device 130.

In another exemplary embodiment, the user who shares content of one or more applications displayed on the computer screen may click on the lock/unlock button to reveal the password protected (i.e. locked) summarized content (e.g. text, graphics, video) and select a context menu to expand the content to full content as needed on the fly. This mechanism prevents unwanted disclosure of confidential or private information and provides the user, who is screen sharing the displayed content, with additional control over the content on the screen share.

In an exemplary embodiment, data summarization module 124 may provide a user of the first computing device 110 with an option to select a context menu to expand the summarized content to full content, as needed, or to contract the full content back to the summarized content, as needed.

With reference to an illustrative example, user A may be engaged in a screen sharing session with user B. Data summarization module 124 may detect that user A has unintended open documents, or applications, displayed on his shared screen, and summarize the content within those documents/applications. Furthermore, data summarization module 124 may summarize the content of an application that user A intended to share with user B. This feature may prevent unintended disclosure of confidential, or private, content based on user A's oversight, or carelessness. In this embodiment, user A maintains full control over the displayed content on her screen by controlling the expanding, or contracting, of the summarized content of shared documents/applications by the click of a mouse, for example. In exemplary embodiments, user A may have the option to turn on/off the data summarization feature at any time.

Figure 4:
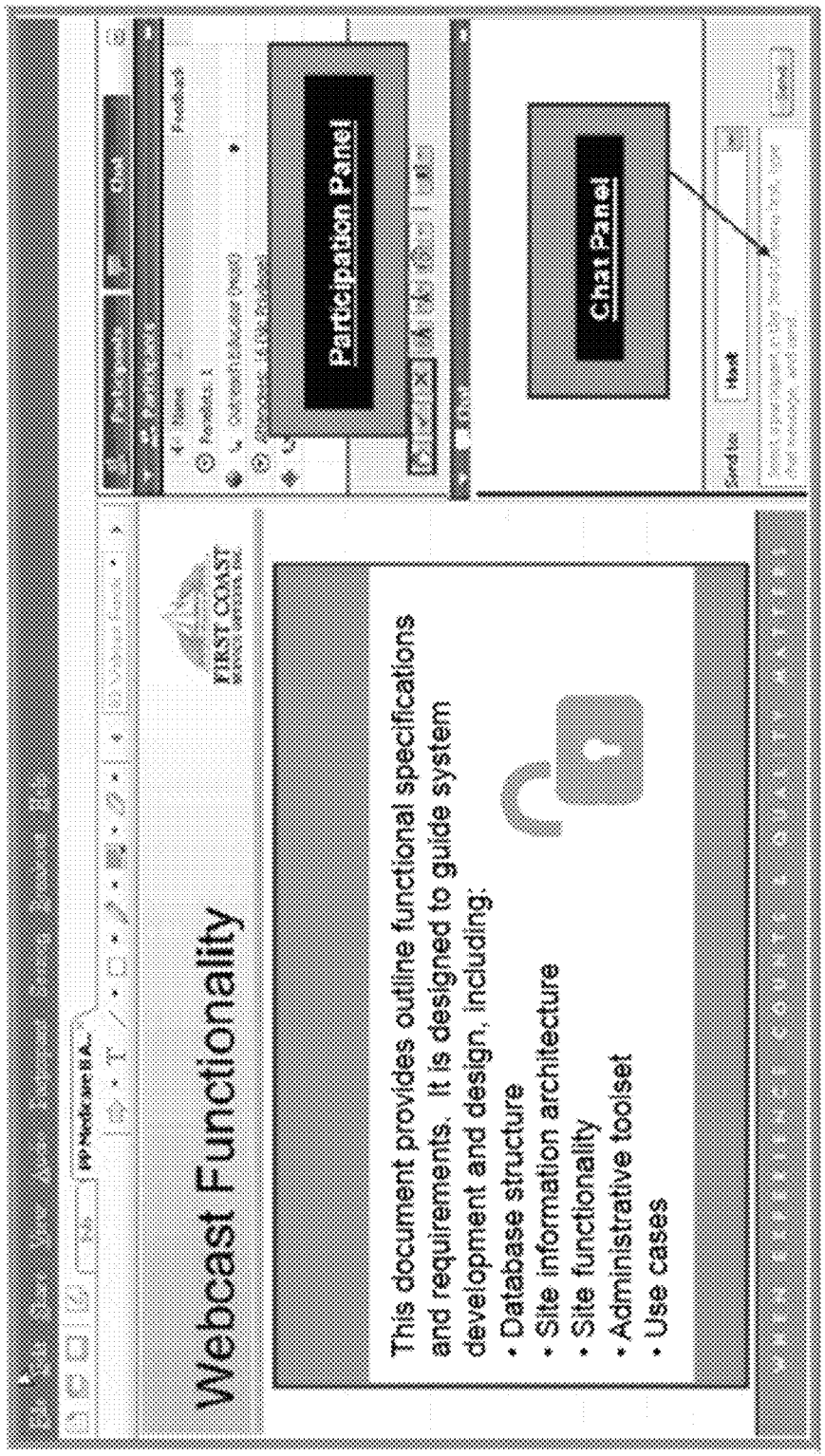
FIG. 4 depicts a shared computer screen containing full content of a slide in a power-point presentation, in accordance with an embodiment of the present invention.

FIG. 4 depicts a shared computer screen containing full content of a slide in a power-point presentation, in accordance with an embodiment of the present invention.

With reference to FIGS. 1-4, in alternative embodiments, data summarization module 124 may share the summarized content of first computing device 110 with second computing device 130, and require a password match, entered by a user of the second computing device 130, to reveal, or share, the content of the one or more shared applications. FIG. 4 depicts a screen share of an application, from computing device 110, to a user of second computing device 130 who successfully enters a password to access the full content of the power-point slide.

In alternative embodiments, data summarization module 124 may determine, by natural language processing, that the received content of the one or more applications contain confidential content, wherein the confidential content comprises any one of a personal name, address, bank information, telephone number, date of birth, and social security number, or any combination thereof, and summarizes the confidential content. For example, natural language processing techniques, within data summarization module 124, may be capable of crawling text within shared content of an application and summarizing the discovered confidential content, for example by replacing it with the appropriate words, such as "Name"; "Private bank information"; "Private SS information"; and so forth.

In alternative embodiments, data summarization module 124 may be capable of blurring, removing, or covering up confidential content discovered by natural language processing techniques.

In alternative embodiments, data summarization module 124 may expand a summarized content to full content during a screen share with second computing device 130, and revert the full content back to the summarized content upon detecting a user is away from the second computing device 130. For example, data summarization module 124 may be capable of detecting idle time of computing device 130 and if a certain threshold of idle time is reached, the full content share may revert back to the summarized content, thus avoiding potentially sensitive content from remaining open on a computer screen of second computing device 130 when a user may have walked away from the computer.

In another alternative embodiment, data summarization module 124 may require a user of second computing device 130 to re-enter a password if a certain threshold of idle time has elapsed without any keyboard strokes. In yet another alternative embodiment, data summarization module 124 may end a screen sharing session altogether if determined that the second computing device 130 is idle for a certain threshold of time.

In another alternative embodiment, data summarization module 124 may revert the full content of a screen share back to a summarized content based on second computing device 130 detecting that a user has moved away from the keyboard, via a camera on second computing device 130. Detection of a user moving away from second computing device 130 may also be determined by picking up a change in the lighting of a room, via the computer camera or light sensors on second computing device 130, which may indicate that a user has left the room.

With continued reference to FIGS. 1 and 2, information delivery module 126 includes a set of programming instructions in screen sharing protection program 120. The set of programming instructions is executable by a processor. Information delivery module 126 transmits, by the first computing device 110, the summarized content, to be shared by the one or more applications, with the second computing device 130 (step 206).

In exemplary embodiments, information delivery module 126 may determine whether it is acceptable to share the summarized content based on a user at second computing device 130 indicating that it is acceptable to share. Based on the user at second computing device 130 indicating it is acceptable to proceed with a screen share, information delivery module 126 may transmit the summarized content to be shared by the one or more applications. For example, information delivery module 126 may pop up an avatar on second computing device 130 to ask the receiver if it is OK to share the screen at the current time. This safety measure may prevent an unwanted screen share, or private message, when there may be other people around or if the user is engaged in a different screen share with other user(s).

In an exemplary embodiment, information delivery module 126 may replace the summarized content with a code name when the second computing device 130 is engaged in a different screen sharing session at the time of receiving the summarized content, wherein the code name is based on a communication history between the first computing device 110 and the second computing device 130. A code name may include a word, a sentence, or a phrase that may refer to a specific document, conversation, topic, etc. that the user of the second computing device 130 may recognize. For example, a user on second computing device 130 may receive an instant message from a user on first computing device 110 referencing a prior confidential instant messaging conversation from earlier that day. A code name (e.g. "Earlier conversation" or "Business project") may convey the topic of the conversation, or a reference to the prior conversation, without revealing any confidential information that may accidentally be seen by a third party in the event the user on second computing device 130 is currently engaged in a screen sharing session with a third party. This safety mechanism prevents the accidental, or incidental, revelation of confidential information to one or more third-parties. When the second computing device 130 is dis-engaged from the third-party screen sharing session, the receiver may then access the information containing the code name.

Figure 5:
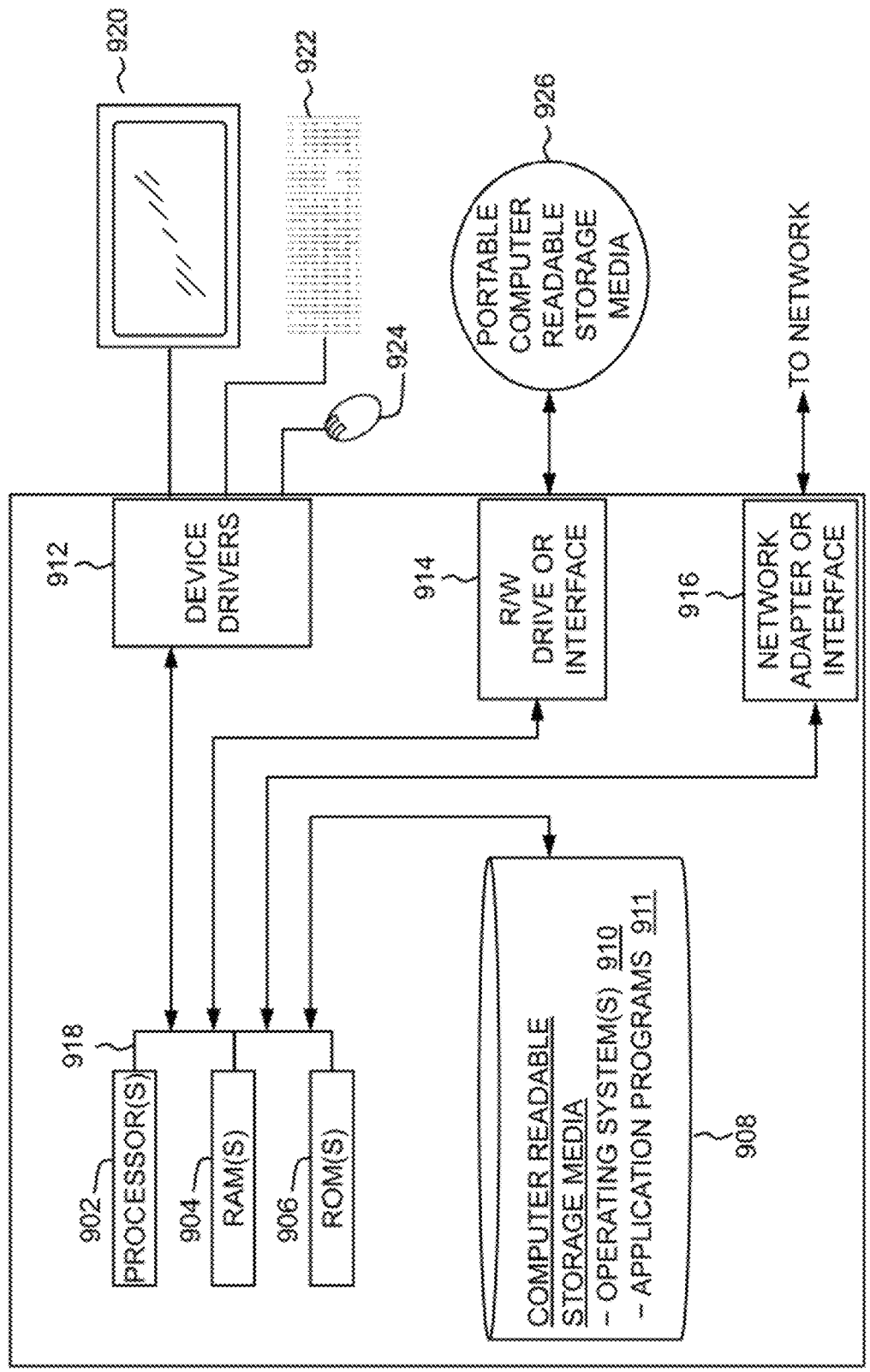
FIG. 5 is a diagram graphically illustrating the hardware components of linked hyper-video computing environment 100 of FIG. 1, in accordance with an embodiment of the present invention.

FIG. 5 is a block diagram depicting components of a computing device in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device of FIG. 5 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as screen sharing protection program 120, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device of FIG. 5 may also include a R/W drive or interface 914 to read from and write to one or more portable computer readable storage media 926. Application programs 911 on computing device may be stored on one or more of the portable computer readable storage media 926, read via the respective R/W drive or interface 914 and loaded into the respective computer readable storage media 908.

Computing device of FIG. 5 may also include a network adapter or interface 916, such as a TCP/IP adapter card or wireless communication adapter (such as a 4G wireless communication adapter using OFDMA technology). Application programs 911 on computing device of FIG. 5 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device of FIG. 5 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 6:
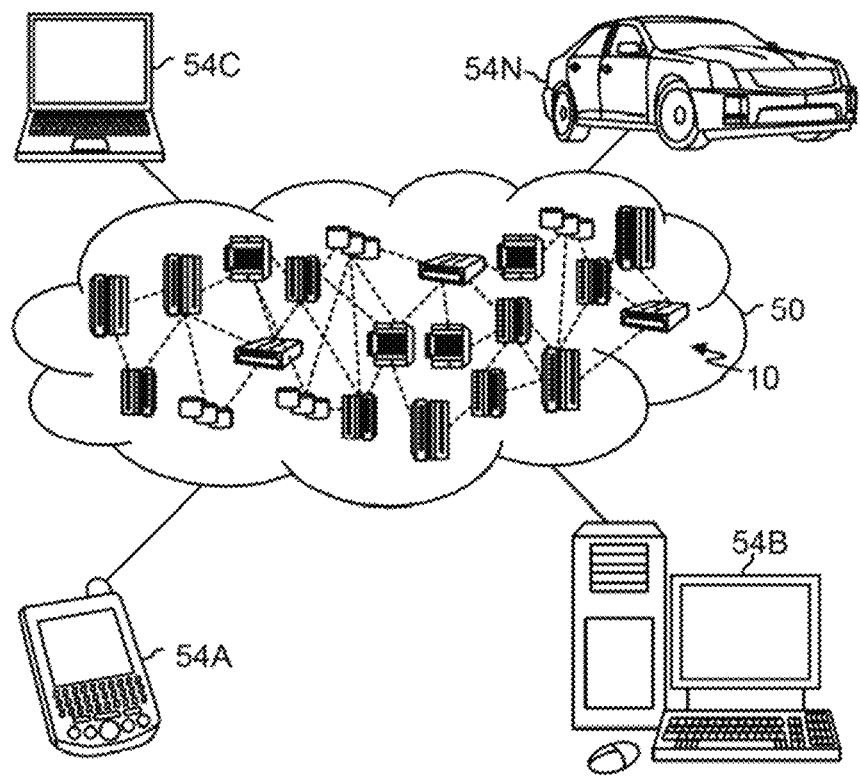
FIG. 6 depicts a cloud computing environment, in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
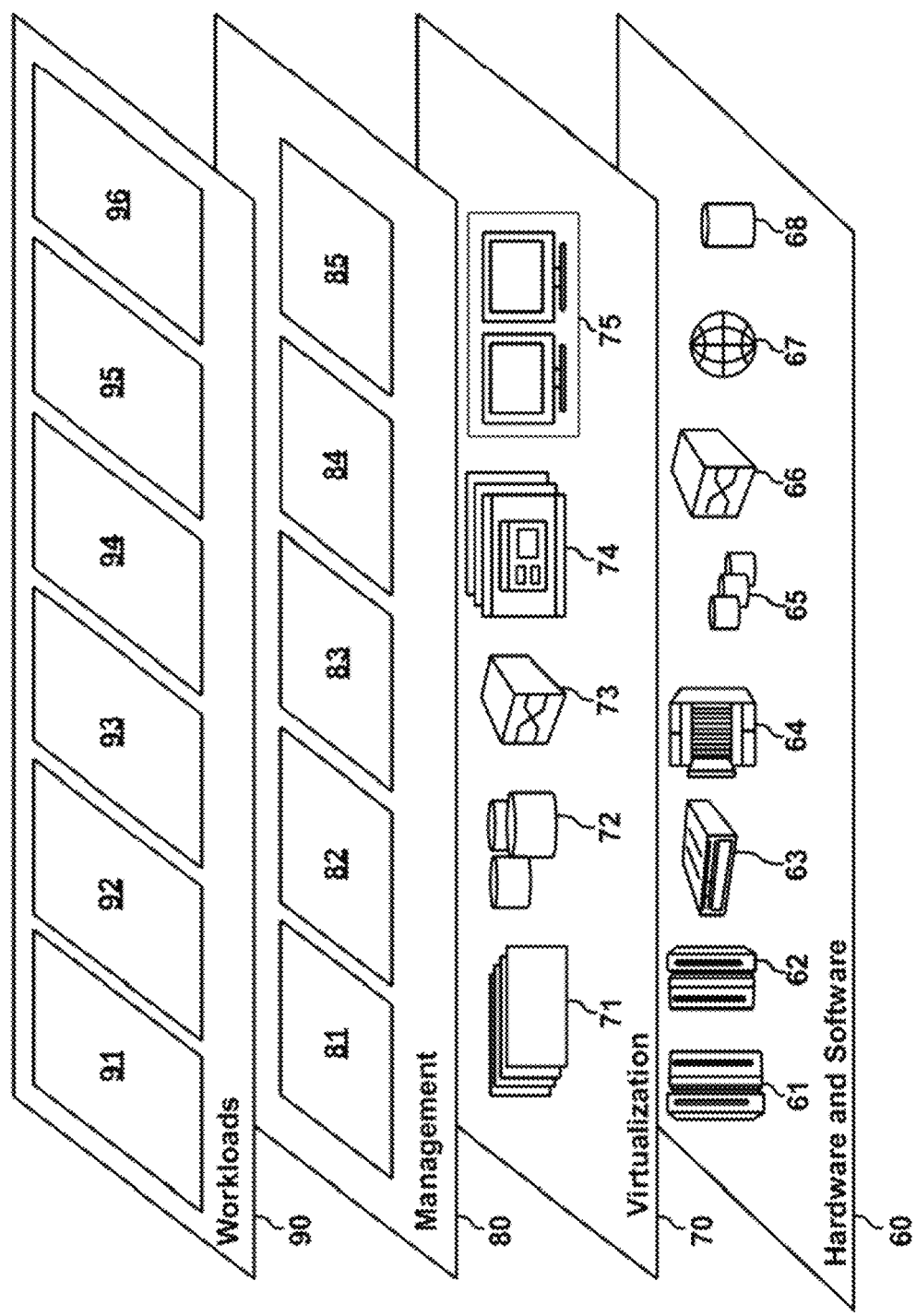
FIG. 7 depicts abstraction model layers of the illustrative cloud computing environment of FIG. 6, in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; analytics services 96, including those described in connection with FIGS. 1-7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for safeguarding confidential information during a screen share session between two computing devices each having a screen, comprising:

summarizing shared content to be displayed by one or more applications;

expanding the summarized content to full content during a screen share with a second computer;

reverting the full content back to the summarized content upon detecting a user is away from the second computer;

replacing the summarized content with a code name when the second computer is engaged in a different screen sharing session, wherein the code name is based on a communication history between the first computer and the second computer;

receiving, by the second computer, the summarized content shared by the one or more applications; and displaying, by the second computer, the summarized content.

2. The computer-implemented method of claim 1, wherein the summarized content is password protected, and further comprising: prompting, by the second computer, a password entry; and displaying, by the second computer, the summarized content based on a password match.

3. The computer-implemented method of claim 1, further comprising:

providing a user of the first computer an option to select a context menu to expand the summarized content to full content, or to contract the full content back to the summarized content.

4. The computer-implemented method of claim 1, further comprising:

receiving, by the first computer, a first computer user input to display the content in place of the summarized content; and displaying, by the second computer, the content.

5. The computer-implemented method of claim 1, wherein summarizing the content of the one or more applications is based on:

determining that the received content of the one or more applications comprise confidential content; and summarizing the confidential content.

6. The computer-implemented method of claim 1, wherein summarizing the content of the one or more applications is based on:

determining, by natural language processing, that the received content of the one or more applications comprise confidential content, wherein the confidential content comprises any one of a personal name, address, bank information, telephone number, date of birth, and social security number, or any combination thereof; and summarizing the confidential content.

7. The computer-implemented method of claim 1, further comprising:

transmitting, by the first computer, the summarized content to be shared by the one or more applications with the second computer based on a user at the second computer indicating it is acceptable to share.

8. The computer-implemented method of claim 1, further comprising:

transmitting, by the first computer, the summarized content to be shared by the one or more applications with the second computer.

9. A computer program product, comprising a non-transitory tangible storage device having program code embodied therewith, the program code executable by a processor of a computer to perform a method, the method comprising:

summarizing shared content to be displayed by one or more applications;

expanding the summarized content to full content during a screen share with a second computer;

reverting the full content back to the summarized content upon detecting a user is away from the second computer;

replacing the summarized content with a code name when the second computer is engaged in a different screen sharing session, wherein the code name is based on a communication history between the first computer and the second computer;

receiving, by the second computer, the summarized content shared by the one or more applications; and displaying, by the second computer, the summarized content.

10. The computer-implemented method of claim 9, further comprising:

providing a user of the first computer an option to select a context menu to expand the summarized content to full content, or to contract the full content back to the summarized content.

11. The computer program product of claim 9, further comprising:

receiving, by the first computer, a first computer user input to display the content in place of the summarized content; and displaying, by the second computer, the content.

12. The computer program product of claim 9, wherein summarizing the content of the one or more applications is based on:

determining that the one or more received content of the one or more applications comprise confidential content; and summarizing the confidential content.

13. The computer program product of claim 9, wherein summarizing the content of the one or more applications is based on:

determining, by natural language processing, that the received content of the one or more applications comprise confidential content, wherein the confidential content comprises any one of a personal name, address, bank information, telephone number, date of birth, and social security number, or any combination thereof; and summarizing the confidential content.

14. The computer program product of claim 9, further comprising:

transmitting, by the first computer, the summarized content to be shared by the one or more applications with the second computer.

15. A computer system, comprising:

one or more computer devices each having one or more processors and one or more tangible storage devices; and a program embodied on at least one of the one or more storage devices, the program having a plurality of program instructions for execution by the one or more processors, the program instructions comprising instructions for:

summarizing shared content to be displayed by one or more applications;

expanding the summarized content to full content during a screen share with a second computer;

reverting the full content back to the summarized content upon detecting a user is away from the second computer;

replacing the summarized content with a code name when the second computer is engaged in a different screen sharing session,
   wherein the code name is based on a communication history between the first computer and the second computer;

receiving, by the second computer, the summarized content shared by the one or more applications; and displaying, by the second computer, the summarized content.

16. The computer system of claim 15, further comprising:

providing a user of the first computer an option to select a context menu to expand the summarized content to full content, or to contract the full content back to the summarized content.

17. The computer system of claim 15, further comprising:

receiving, by the first computer, a first computer user input to display the content in place of the summarized content; and displaying, by the second computer, the content.

\* \* \* \* \*